Patented Aug. 7, 1928.

1,679,777

UNITED STATES PATENT OFFICE.

ARTHUR R. MOBERG, OF ELMHURST, ILLINOIS, ASSIGNOR, BY MESNE ASSIGNMENTS, TO NATIONAL ALUMINATE CORPORATION, OF CHICAGO, ILLINOIS, A CORPORATION OF DELAWARE.

PROCESS OF TREATING WATER.

No Drawing.   Application filed December 23, 1926.   Serial No. 156,767.

My invention relates to a process of treating water for the purpose of clarifying and purifying the water to render it adaptable for manufacturing and domestic purposes. This present invention is an improvement upon the process of purifying potable and other waters as described in U. S. Patent No. 341,853 of May 11, 1886 to Lyte.

In the treating of water for the purpose of clarifying and purifying them and in the treatment of natural water for the purpose of removing suspended or colloidal impurities, it has long been the practice to employ aluminum sulphate commonly known as "filter-alum." When employing this aluminum sulphate, the water was purified by the action of the natural alkalinity of the water upon the aluminum sulphate and, in the absence of natural alkalinity of the water, was, in certain instances, only partially purified by the reaction between the particular impurities in the water and the aluminum sulphate, depending upon the character of the impurities.

When water has been treated by employing aluminum sulphate only, it has been ascertained that, under certain conditions, especially when the water contains organic or inorganic impurities, the action between the aluminum sulphate and the impurities to be removed, or the reaction between the aluminum sulphate and the natural alkalinity of the water, would not go to completion and, therefore, the impurities would not be completely precipitated. These colloids exert an inhibitory action upon the above mentioned reactions, as a result of which some of the aluminum sulphate will be found in the water after the treatment. This not only causes a needless loss of the reagent, but also is objectionable as the aluminum sulphate may interfere with the use of the water thus purified.

Now I have discovered that by the addition of relatively small amounts of sodium aluminate, preferably in solution, to the water to be treated, either before, simultaneously with, or subsequent to the addition of the aluminum sulphate, the inhibitory action of the colloids upon the reaction between the aluminum sulphate and the impurities to be precipitated from the water will be prevented, and, in consequence thereof, the aluminum sulphate will react substantially completely with the said impurities whereby the water will be successfully clarified and purified without retaining any substantial quantity of aluminum sulphate in solution in the water.

The theory upon which my invention is based is, essentially, as follows: although, obviously I do not care to be bound by this theory, as other possible explanations of the observed action may be given. The sodium aluminate, especially in the particular form in which it is used, and as will be explained more fully below, will react with the impurities in the water, and especially with the colloids and suspensoids, so that there will be formed a precipitate or nucleuses of hydrated aluminum oxide, which serve the dual function of adsorbing the aforesaid colloids, thus removing them from the zone of action, and also as nucleuses for the precipitation of the aluminum compounds formed as a result of the action of the aluminum sulphate upon the impurities in the water undergoing treatment.

Experiments have demonstrated that water having as low an alkalinity as 15 parts per million, and which would not respond to the use of aluminum sulphate because of the insufficiency of the alkali contained in said water, could be rendered amenable to treatment with aluminum sulphate by the addition of a very small amount of sodium aluminate preferably in solution, as will be more specifically set forth below.

The presence of the initially formed nucleuses of aluminum hydroxide occasioned by the reaction between the aluminum sulphate and the small quantity of sodium aluminate will enable the aluminum sulphate to hydrolyze substantially completely, with the resultant formation of aluminum hydroxide. Theoretically, the sodium aluminate acts as a buffer for the aluminum sulphate; a term well understood in physical chemistry and colloid behavior.

The sodium aluminate that I preferably employ in practicing this invention is the sodium aluminate solution described in U. S. Patent No. 1,604,124 to Kern, of October 26, 1926. I have found that a solution of sodium aluminate having the approximate composition of

| | Average per cent. |
|---|---|
| 33% $Na_2Al_2O_4$ | 30–35 |
| 9% NaOH | 5–15 |
| 58% water | Balance water | is very satisfactory.

The sodium almuinate, which will be referred to herein for the sake of convenience as the sodium aluminate reagent, is used in amounts of from $\frac{1}{4}$ to $\frac{1}{10}$ of the amount of the aluminum sulphate used to treat the water. For example, if from 1 to 10 grains of aluminum sulphate are used per gallon of water treated, from 0.1 to 1 grain of sodium aluminate reagent may be used. Under specific conditions, and depending entirely upon the nature of the water to be treated, up to 2.5 grains of the sodium aluminum reagent may be used to each 10 grains of the aluminum sulphate. The molecular weight of $Al_2(SO_4)_3$ being 342.2, and of sodium aluminate ($Na_2Al_2O_4$) being 164.2, the ratio between the aluminum sulphate and sodium aluminate in the case where 2.5 grains of sodium aluminate were used to each 10 grains of aluminum sulphate is 8.36:1. I have found that satisfactory results are obtained when the ratio of the aluminum sulphate to the sodium aluminate is at least four to one, that is to say when at least four mols of aluminum sulphate are used to each mol of sodium aluminate.

The use of the sodium aluminate together with the aluminum sulphate makes it possible to regulate closely the acidity or alkalinity, usually expressed in terms of hydrogen ion concentration or pH values, of the effluent or purified water.

An example from actual practice shows the following results:

A water with a natural pH of 7.0, an alkalinity of 15 parts per million and a color of 280 parts per million required the use of 4½ grains of aluminum sulphate per gallon, plus the addition of sufficient acid, to bring the pH value of the water to 5.2, the optimum coagulating pH point or the point at which the coagulation of the impurities would take place. The water subsequent to this treatment required the addition of lime to raise the pH to the neutral point of 7.0. The same water was purified, in accordance with the present invention, by the use of only 3 grains of aluminum sulphate per gallon, plus ½ grain of the sodium aluminate reagent per gallon, and coagulation of the impurities took place at as low an acidity as corresponds to a pH of 6.8, or practically at the neutral point and without the addition of any acid. By suitably varying the ratio between the aluminum sulphate and the sodium aluminate reagent, the water can be delivered, properly clarified and purified, at substantially any desired pH value. The theory of operation of my process as applied to the specific illustrative example described above, may be explained as follows, but it is to be understood that I am not to be limited to this explanation inasmuch as the results obtained by my invention may be explained otherwise. It is my present theory that the colloidal organic matter present in the water had a positive charge and therefore demanded satisfaction of its negative requirements before formation and precipitation of the aluminum hydroxide would occur. The slight amount of sodium aluminate solution that I added allowed of an immediate reaction between it and a portion of the aluminum sulphate because of the very slightly ionized condition of the unstable sodium aluminate, and this reaction formed nucleuses which by the action of catalysis and hydrolysis permitted complete reaction and precpitation of the whole mass of the aluminum compounds carrying with them, by a process of occlusion, substantially the entire amount of organic colored matter from the water.

It will thus be seen that I have provided a new and useful method for treating water by purifying and clarifying it.

While I have described my invention as practiced in a specific form, it is to be understood that I do not desire to be limited to the specific examples herein described, since my invention is not to be limited except in accordance with the appended claims.

I claim:

1. The process of purifying and clarifying water which comprises adding sodium aluminate and aluminum sulphate to the water to be treated, the sodium aluminate being in relatively small quantities as compared with the aluminum sulphate.

2. The process of purifying and clarifying water which comprises adding aluminum sulphate and a solution of sodium aluminate to the water to be treated, the quantity of sodium aluminate solution being relatively small as compared with the aluminium sulphate.

3. The process of treating water which consists in adding thereto sodium aluminate and aluminum sulphate, the quantity of said aluminum sulphate being in excess of four times the quantity of sodium aluminate, thereby causing substantially complete reaction of the aluminum sulphate with the coagulable impurities in the water.

4. The process of treating water which consists in adding thereto a quantity of aluminum sulphate and a quantity of sodium aluminate solution, the former being present in a quantity in excess of four times the quantity of the latter whereby substantially complete reaction of the aluminum sulphate may obtain with the coagulable constituents in the water.

5. In the process of clarifying and purifying water wherein aluminum sulphate is added to the water, the step which comprises adding an amount of sodium aluminate relatively smaller than the amount of aluminum sulphate, whereby complete reaction of said aluminum sulphate with the coagulable and precipitable impurities in the water is effected.

6. The process of purifying water which comprises adding thereto aluminum sulphate, and a relatively small amount of sodium aluminate solution, the former in substantially ten times the quantity of the latter whereby the impurities in the water may be substantially coagulated and precipitated.

7. The process of treating water which comprises adding thereto a quantity of aluminum sulphate and sodium aluminate solution, the ratio between the aluminum sulphate and sodium aluminate being in excess of 4:1 so that the reaction between the aluminum sulphate and the coagulable constituents in the water may be accelerated.

8. The process for treating water which comprises adding thereto aluminum sulphate and a solution of sodium aluminate in an amount insufficient to precipitate all of the aluminum component of said aluminum sulphate whereby nucleuses of aluminum hydroxide are formed which assist the coagulating action of the residual aluminum sulphate remaining in the water.

9. The process of treating water which comprises adding thereto aluminum sulphate and a substantially less quantity of sodium aluminate whereby a portion only of the aluminum component of said aluminum sulphate will be precipitated to form nucleuses of aluminum hydroxide which will enhance the coagulating action of the residual aluminum sulphate remaining in the water.

10. The process of treating water which comprises adding thereto aluminum sulphate and sodium aluminate solution, the latter in sufficient quantity only to precipitate partially the aluminum component of the said aluminum sulphate.

11. The process of treating water which comprises adding thereto aluminum sulphate and a solution of sodium aluminate, the ratio between the aluminum sulphate and the sodium aluminate being so proportioned that at the completion of the reaction between the two reagents a substantial amount of aluminum sulphate will remain unacted upon so as to be capable of reacting with the coagulable impurities in the water to be purified.

12. The process of coagulating and precipitating impurities in water which comprises adding to the water a quantity of commercial "filter-alum" and sodium aluminate, the latter in an amount insufficient to precipitate the entire aluminum content of the alum, whereby complete reaction of the impurities with the alum is effected.

13. In the precipitation and coagulation of impurities in municipal water supplies by means of alum coagulation, the step which comprises adding to the water a small amount of sodium aluminate which, while insufficient in amount to precipitate all the aluminum content of the alum, assures complete reaction of the added alum and the impurities in the water.

In witness whereof, I have hereunto subscribed my name.

ARTHUR R. MOBERG.